United States Patent
Bansal et al.

(10) Patent No.: US 10,676,614 B2
(45) Date of Patent: Jun. 9, 2020

(54) HIGH MOLECULAR AND LOW MOLECULAR WEIGHT FINE FIBERS AND TPU FINE FIBERS

(71) Applicants: Vishal Bansal, Lee's Summit, MO (US); Thomas D. Carr, Franklin, TN (US); Yogesh Ner, Spring Hill, TN (US); Kaiyi Liu, Spring Hill, TN (US); Stephen R. Kay, Austin, TX (US)

(72) Inventors: Vishal Bansal, Lee's Summit, MO (US); Thomas D. Carr, Franklin, TN (US); Yogesh Ner, Spring Hill, TN (US); Kaiyi Liu, Spring Hill, TN (US); Stephen R. Kay, Austin, TX (US)

(73) Assignee: CLARCOR Inc., Franklin, TN (US)

( * ) Notice: Subject to any disclaimer, the term of this patent is extended or adjusted under 35 U.S.C. 154(b) by 129 days.

(21) Appl. No.: 15/490,680

(22) Filed: Apr. 18, 2017

(65) Prior Publication Data

US 2017/0306148 A1    Oct. 26, 2017

Related U.S. Application Data

(60) Provisional application No. 62/325,356, filed on Apr. 20, 2016.

(51) Int. Cl.
*C08L 75/04* (2006.01)
*D01D 5/18* (2006.01)
*D04H 1/54* (2012.01)
*D01D 5/42* (2006.01)
*D01D 5/04* (2006.01)

(52) U.S. Cl.
CPC ............. *C08L 75/04* (2013.01); *D01D 5/04* (2013.01); *D01D 5/18* (2013.01); *D01D 5/42* (2013.01); *D04H 1/54* (2013.01); *C08L 2203/12* (2013.01); *C08L 2205/025* (2013.01); *C08L 2205/16* (2013.01); *C08L 2207/04* (2013.01)

(58) Field of Classification Search
CPC .......................................................... D01F 6/44
USPC .......................................................... 428/364
See application file for complete search history.

(56) References Cited

U.S. PATENT DOCUMENTS

| 4,842,922 | A | 6/1989 | Krupp et al. |
| 5,164,131 | A | 11/1992 | Chau et al. |
| 5,164,132 | A | 11/1992 | Robeson et al. |

(Continued)

FOREIGN PATENT DOCUMENTS

| EP | 2589422 | 5/2013 |
| EP | 3064262 | 9/2016 |

(Continued)

OTHER PUBLICATIONS

U.S. Appl. No. 15/490,586, Bansal et al., filed Apr. 18, 2017.
U.S. Appl. No. 15/493,266, Bansal et al., filed Apr. 21, 2017.
U.S. Appl. No. 15/490,707, Bansal et al., filed Apr. 18, 2017.

*Primary Examiner* — Brent T O'Hern
(74) *Attorney, Agent, or Firm* — Reinhart Boerner Van Deuren P.C.

(57) ABSTRACT

In embodiments, the present invention provides a plurality of fine fiber strands made from a first polymer and a second polymer where the second polymer has a higher molecular weight than the first polymer. In preferred embodiments, the fine fiber strands have an average diameter of less than 2 micron, and the fine fiber strands have a length of at least 1 millimeter.

15 Claims, 5 Drawing Sheets

(56) References Cited

U.S. PATENT DOCUMENTS

| | | |
|---|---|---|
| 5,190,812 A | 3/1993 | Robeson et al. |
| 7,690,902 B2 | 4/2010 | Erickson et al. |
| 8,647,540 B2 | 2/2014 | Peno et al. |
| 8,647,541 B2 | 2/2014 | Peno et al. |
| 8,709,309 B2 | 4/2014 | Peno et al. |
| 8,778,240 B2 | 7/2014 | Peno et al. |
| 9,181,635 B2 | 11/2015 | Peno et al. |
| 9,259,689 B2 | 2/2016 | Waller, Jr. et al. |
| 2002/0100153 A1 | 8/2002 | Takai et al. |
| 2004/0035095 A1 | 2/2004 | Healey |
| 2004/0116025 A1 | 6/2004 | Gogins et al. |
| 2006/0099414 A1 | 5/2006 | Koops et al. |
| 2007/0190319 A1 * | 8/2007 | Kalayci ............... D01D 5/0084 428/364 |
| 2007/0237849 A1 | 10/2007 | Erickson et al. |
| 2009/0269429 A1 | 10/2009 | Lozano et al. |
| 2010/0075560 A1 | 3/2010 | Seshadri et al. |
| 2010/0312208 A1 | 12/2010 | Bond et al. |
| 2012/0294966 A1 | 11/2012 | Peno et al. |
| 2012/0295021 A1 | 11/2012 | Peno et al. |
| 2014/0035177 A1 | 2/2014 | Lipton et al. |
| 2014/0035178 A1 | 2/2014 | Kay et al. |
| 2014/0035179 A1 | 2/2014 | Kay et al. |
| 2014/0042651 A1 | 2/2014 | Kay et al. |
| 2014/0159262 A1 | 6/2014 | Kay et al. |
| 2014/0217628 A1 | 8/2014 | Peno et al. |
| 2014/0217629 A1 | 8/2014 | Peno et al. |
| 2014/0296464 A1 | 10/2014 | Bracewell et al. |
| 2014/0339717 A1 | 11/2014 | Peno et al. |
| 2015/0013141 A1 | 1/2015 | Peno et al. |
| 2015/0354139 A1 | 12/2015 | Geisen et al. |
| 2016/0047061 A1 | 2/2016 | Huang et al. |
| 2016/0051919 A1 | 2/2016 | Nagy et al. |
| 2016/0069000 A1 | 3/2016 | Kay et al. |
| 2016/0083867 A1 | 3/2016 | Peno et al. |

FOREIGN PATENT DOCUMENTS

| | | |
|---|---|---|
| WO | WO 2015/008882 A1 | 1/2015 |
| WO | WO 2015/016450 A1 | 2/2015 |
| WO | WO 2015016449 | 2/2015 |

* cited by examiner

HIGH MOLECULAR AND LOW MOLECULAR WEIGHT FINE FIBERS AND TPU FINE FIBERS

CROSS-REFERENCE TO RELATED PATENT APPLICATIONS

This patent application claims the benefit of U.S. Provisional Patent Application No. 62/325,356, filed Apr. 20, 2016, the entire teachings and disclosure of which are incorporated herein by reference thereto.

FIELD OF THE INVENTION

This invention generally relates to a fiber strand comprised of two or more polymers, and more particularly, this invention relates to a fiber strand in which one of the polymers has a higher molecular weight than the at least one other polymer in the fiber strand.

BACKGROUND OF THE INVENTION

Methods of and apparatuses for producing nanofibers are known by way of centrifugal spinning. Exemplary disclosures include U.S. Publication Nos. 2016/0083867, 2016/0069000, 2015/0013141, 2014/0339717, 2014/0217629, 2014/0217628, 2014/0159262, 2014/0042651, 2014/035179, 2014/0035178, 2014/0035177, 2012/0295021, and 2012/0294966 and U.S. Pat. Nos. 9,181,635; 8,778,240; 8,709,309; 8,647,541; and 8,647,540. These entire disclosures are incorporated in their entireties herein by reference. As such, centrifugal spinning, spinnerets, materials, and methods disclosed in these references are preferred for use in an embodiment of the present invention that provides for improvements and new uses for such centrifugal spinning systems.

BRIEF SUMMARY OF THE INVENTION

The inventive aspects and embodiments discussed below in the following separate paragraphs of the summary may be used independently or in combination with each other.

In one aspect, the present invention provides a plurality of fine fiber strands made from a first polymer and a second polymer where the second polymer has a higher molecular weight than the first polymer. In preferred embodiments, the fine fiber strands have an average diameter of less than 2 micron, and the fine fiber strands have a length of at least 1 millimeter.

In a most preferred embodiment, the second polymer has a molecular weight that is 1.5 times higher than the first polymer.

In a particular configuration, the second polymer comprises between 1% and 25%, by weight, of the fine fiber strands.

Preferably, the first and second polymers are selected from the group consisting of polytetrafluoroethylene, polyvinylidene fluoride, other fluoropolymers, polyamide, polyester, cellulose and its derivatives, polysulfone, polyethylene, polypropylene, polystyrene, poly(4-vinylpyridine), and thermoplastic urethanes.

In certain embodiments, the one of the first and second polymer is selected to be more hydrophobic, have a higher strength, or have a higher tear resistance than the other of the first and second polymer.

In another aspect, a solution for centrifugally spinning the fine fiber strands is provided. Preferably, the polymer solution has a polymer concentration of at least 10%, by weight, of the first polymer and the second polymer.

In a particular embodiment, the second polymer comprises between 1 and 25%, by weight, of the polymer concentration.

In still another aspect, a method of forming the fine fiber strands is provided. The method involves the steps of dissolving the first and the second polymers in a solvent to form a polymer solution, the second polymer having a higher molecular weight than the first polymer; centrifugally expelling the polymer solution through orifices in at least one spinneret while rotating the spinneret at a speed of at least 2500 rpm; and drawing down a fiber diameter of the fine fiber strands through centrifugal force.

In a further aspect, a method of forming a fibrous web from the plurality of fine fiber strands is provided. The method involves the steps of depositing the plurality of fine fiber strands on a substrate and thermally, chemically, or adhesively bonding at least a portion of the plurality of fine fiber strands to the substrate.

In a particular embodiment, the substrate is a scrim made from a material selected from the group consisting of polyester, polypropylene, polytetrafluoroethylene, polyvinylidene fluoride, polyamides, cellulose, and combinations thereof.

In another embodiment, the thermal bonding step includes the use of at least one set of hot calendaring rolls.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
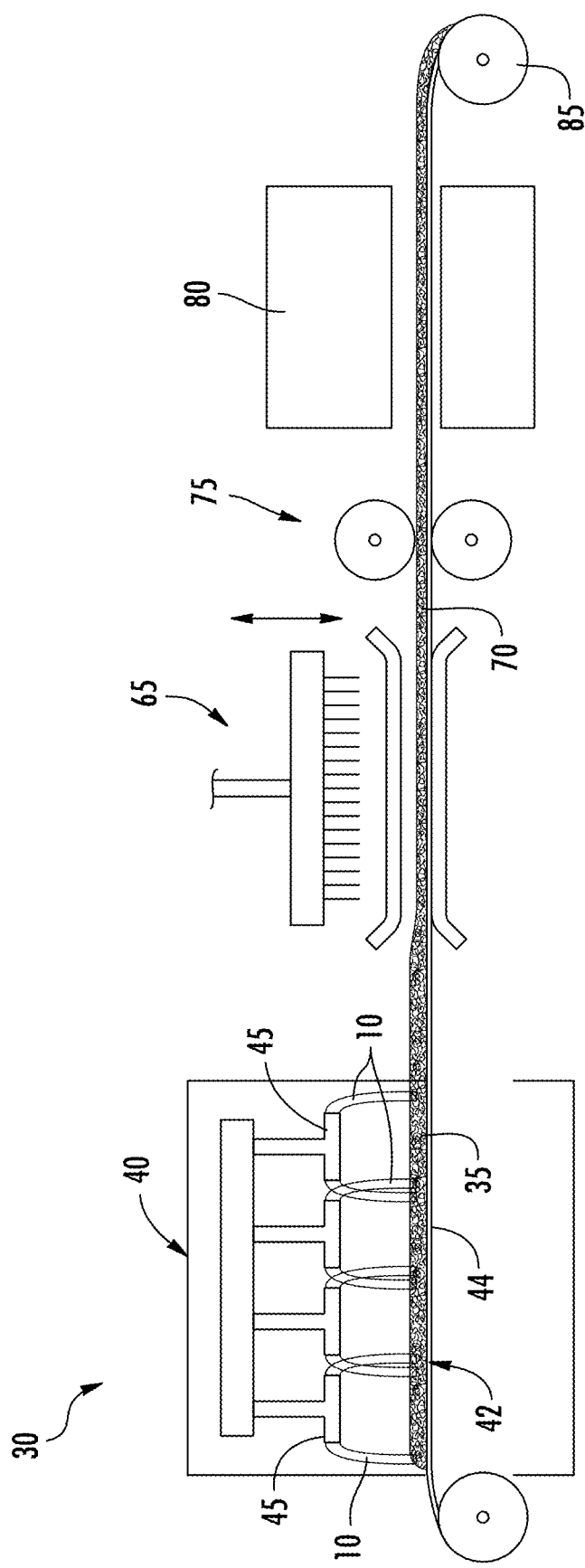
FIG. 1 depicts a schematic representation (not to scale) of a manufacturing line for forming a web of fine fiber comprised of at least two polymers according to an exemplary embodiment.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

According to embodiments of the present invention, fine fiber strands 10 are provided in which the fine fiber strands 10 are comprised of at least two polymers, a first polymer and a second polymer. In preferred embodiments, the second polymer has a higher molecular weight than the first polymer. More preferably, the second polymer has a molecular weight that is 1.5 times higher than the first polymer.

The fine fiber strand 10 is preferably made from a polymer solution in which the first and second polymer comprise at least 10%, by weight, of the solution. More preferably, the first and second polymer comprise at least 20%, by weight, of the solution, and most preferably, the first and second polymer comprise at least 23%, by weight, of the solution. Together, the total amount of first and second polymer within the solution is referred to herein as the "polymer concentration." The remainder of the solution is solvent, such as dimethylformamide (DMF), tetrahydrofuran (THF), or a mixture thereof. Other solvents or their mixture can be used in such a way that both polymers form a homogenous solution. Examples of some of the solvents include, but are not limited to, methyl ether ketone (MEK), dimethylsulfoxide (DMSO), acetone, toluene, ethyl acetate, dimethylacetamide (DMAc), formic acid, among others.

The first polymer and second polymer can be dissolved separately in preferred solvents, and the solution of the second polymer can then be mixed with the solution of the first polymer to form a final solution of first and second polymer with a polymer concentration of preferably at least 15%. More preferably, the polymer concentration is between 15% and 25%, inclusive. Within the solution of the first and second polymer, preferably the second polymer comprises between 1% and 25%, by weight, of the polymer concentration.

The first and second polymer can be any of a variety of suitable polymers that are selected for their desired characteristics. In embodiments, the first and second polymer can be selected from the following polymers, including polytetrafluoroethylene, polyvinylidene fluoride, other fluoropolymers, polyamide, polyester, cellulose and its derivatives, polysulfone, polyethylene, polypropylene, polystyrene, poly(4-vinylpyridine), and thermoplastic urethanes (TPU).

The first and second polymer can be from the same family, e.g., they can both be types of TPU. Additionally, the first and second polymer may have the same molecular composition with a difference of molecular weight, e.g., a first polymer of TPU resin with a molecular weight of 100,000 and a second polymer of TPU resin with a molecular weight of more than 150,000.

In certain embodiments, the combination of the first and second polymers can be selected so as to derive a separate benefit from each of the polymers selected or to derive an additive benefit from the polymer selection. For instance, the polymers can be selected based on its superior hydrophobicity, hydrophilicity, strength, and/or tear resistance. Thus, the first polymer may be selected for its hydrophobic characteristics, while the second fiber may be selected for its superior strength. In this way, the fine fiber strand 10 will exhibit contributions from each of the first and second polymer. Alternatively, the two polymers can each be selected, for example, for their hydrophobic characteristics, thereby providing an additive benefit. Additionally, the first and second polymers can be selected to have the same or different molecular weight distribution, molecular composition, crystallinity, melt flow index, and/or viscosity.

Moreover, while two polymers are discussed, nothing in this disclosure should be read as limiting the fine fiber strands 10 to being formed from only two polymers. More than two polymers can be added to the solution from which the fine fiber strands 10 are derived. Additionally, the polymers can be selected to each provide a separate benefit or to provide an additive benefit to the fine fiber strands 10.

FIG. 1 depicts an exemplary embodiment of a manufacturing line 30 for creating fine fibers 10 comprised of at least two polymers. The fine fibers 10 are deposited as a loose batt 35 in a fiber deposition chamber 40. The fine fibers 10 are preferably produced via centrifugal spinning (herein referred to as "Forcespinning®") and deposited on a moving substrate 42. The moving substrate 42 can be incorporated into the loose batt 35 of fine fibers 10, such as with a scrim material 44 (i.e., a porous substrate) as depicted in FIG. 1, or the moving substrate can be separate from the loose batt 35 of fine fibers 10, such as a conveyor system.

Figure 2:
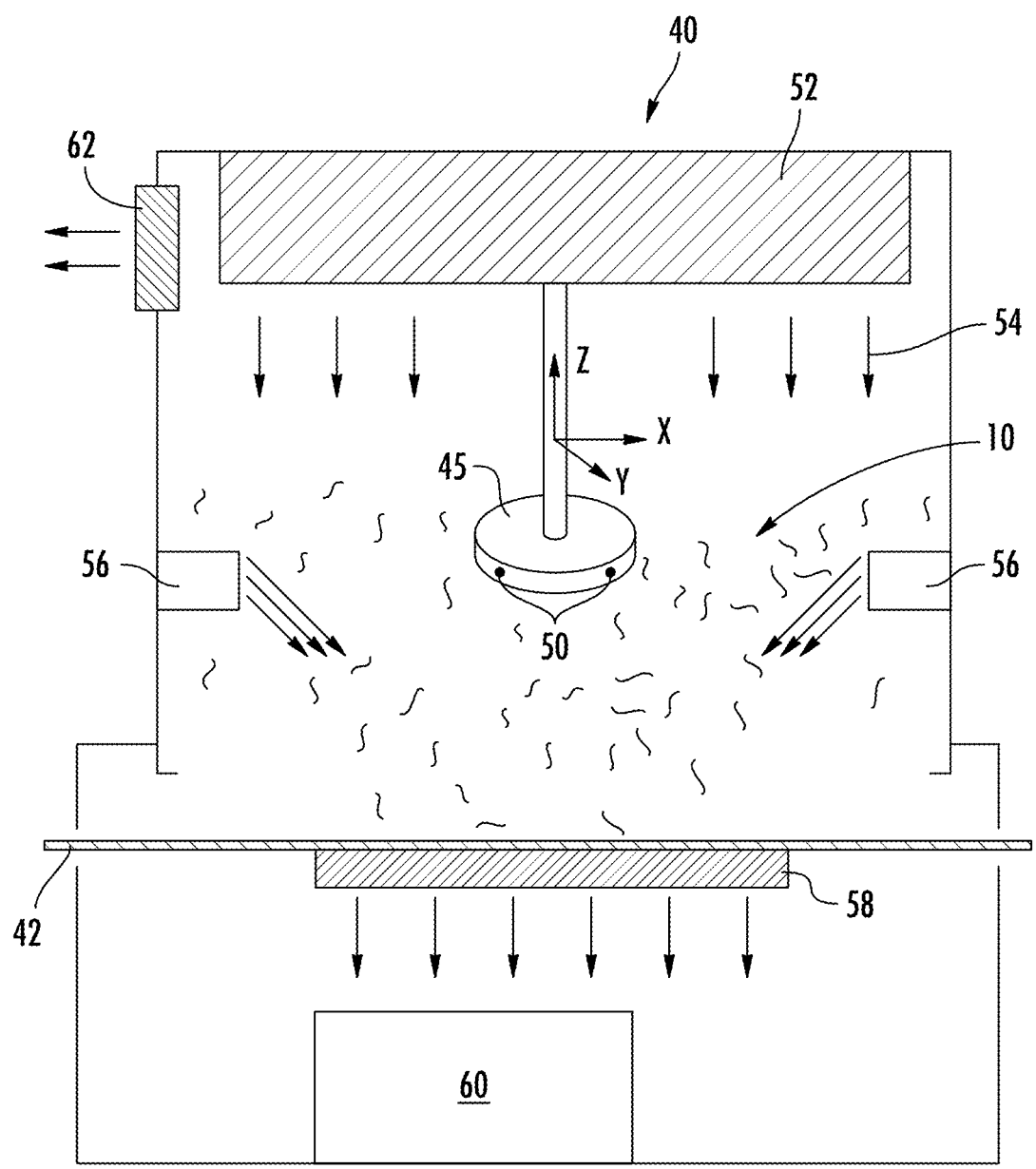
FIG. 2 depicts a schematic representation (not to scale) of a deposition chamber on the manufacturing line of FIG. 1 for forming a web of fine fiber comprised of at least two polymers.

FIG. 2 depicts a more detailed schematic view of a section of the fiber deposition chamber 40. As depicted in FIGS. 1 and 2, the deposition chamber 40 is a Forcespinning® chamber. Forcespinning® involves centrifugally expelling a liquid polymer (in this case a polymer solution) through orifices in at least one spinneret 45 while rotating the spinneret 45 at a speed of at least 2500 rpms. This centrifugal action results in the drawing down of the fiber diameter of the fine fibers. It should be noted that Forcespinning® draws down the diameter of the fine fiber using centrifugal forces.

The deposition chamber 40 of FIG. 2 depicts a single spinneret 45, but more spinnerets 45 can be included in the deposition chamber 40, such as shown in FIG. 1, depending on the amount of fine fibers 10 needed. The spinnerets 45 typically are capable of moving in the X, Y, and Z planes to provide a range of coverage options for producing the loose batt 35. Each spinneret 45 features a plurality of orifices 50 through which the fine fibers 10 are expelled. The orifices 50 can each be connected to the same reservoir of polymer melt, polymer solution, or liquid adhesive, or each orifice 50 can be connected to a different reservoir of polymer melt, polymer solution, or liquid adhesive. Moreover, in embodiments with multiple spinnerets 45, each spinneret 45 can expel a different polymer melt, polymer solution, or liquid adhesive. During fine fiber deposition, the spinnerets 45 will rotate at least at 2500 rpm. More typically, the spinnerets 45 will rotate at least at 5000 rpm.

Using the spinnerets 45, the fine fibers 10 can be created using, for example, a solution spinning method or a melt spinning method. A polymer melt can be formed, for example, by melting a polymer or a polymer solution may be formed by dissolving a polymer in a solvent. Polymer melts and/or polymer solutions as used herein also refers to the material formed from heating the polymer to a temperature below the melting point and then dissolving the polymer in a solvent, i.e., creating a "polymer solution." The polymer solution may further be designed to achieve a desired viscosity, or a surfactant may be added to improve flow, or a plasticizer may be added to soften a rigid fiber, or an ionic conductor may be added to improve conductivity. The polymer melt can additionally contain polymer additives, such as antioxidants or colorants.

Several optional features of the deposition chamber 40 are depicted in FIG. 2. Generally, the fine fibers 10 are preferably continuous fibers (though the fine fibers 10 are depicted schematically as short fibers in FIG. 2). The fine fibers 10 can be encouraged downwardly to collect on the moving substrate 42 through a variety of mechanisms that can work independently or in conjunction with each other. For example, in some embodiments, a gas flow system 52 can be provided to induce a downward gas flow, depicted with arrows 54. The gas flow system 52 can also include lateral gas flow jets 56 that can be controlled to direct gas flow in different directions within the deposition chamber 40. Additionally, in some embodiments, formation of the fine fibers 10 will induce an electrostatic charge, either positive or negative, in the fiber. This electrostatic charge is not primarily used to draw the fiber such as in electrospinning. Nevertheless, an electrostatic plate 58 can be used to attract the charged fibers 10 downwardly to the moving substrate 42. Thus, as can be seen in FIG. 3, the electrostatic plate 58 is located below the moving substrate 42. Furthermore, in some embodiments, a vacuum system 60 is provided at the bottom of the deposition chamber 40 to further encourage the fine fibers 10 to collect on the moving substrate 42. Still further, in some embodiments, an outlet fan 62 is provided to evacuate any gasses that may develop, such as might develop as the result of solvent evaporation or material gasification, during the Forcespinning® process.

In other embodiments, the fine fiber 10 can be deposited using a different method than Forcespinning® or in conjunction with Forcespinning®. For example, in one embodiment, the fine fiber 10 can be produced via electrospinning.

The fine fiber strands 10 that are incorporated into the loose batt 35 have a length greater than 1 millimeter and an average diameter of less than 2 micron. More preferably, the fine fiber strands 10 have a length greater than 10 cm and an average diameter less than 2 micron, and most preferably, the fine fiber strands 10 have a length greater than 1 meter (i.e., continuous strands).

Returning to FIG. 1, the loose batt 35 of fine fibers 10 is transported out of the deposition chamber 40 on the moving substrate 42. The Forcespinning® process may produce enough fiber entanglement by itself that further entanglement is unnecessary. However, as depicted in FIG. 1, the loose batt 35 is transported to a needlepunching machine 65 to increase the amount of entanglement of the fine fibers 10. In embodiments, the needlepunching machine 65 punches the fine fibers 10 into the scrim or porous substrate 42. Once the fibers are sufficiently entangled, either through Forcespinning® alone or through an entanglement process, such as needlepunching, the fine fibers 10 form a fibrous web 70.

Optionally, the fibrous web 70 can be further processed to enhance the bonding of the fibers or to increase the density of the media. As depicted in FIG. 1, the fibrous web 70 travels through calendaring rolls 75. Multiple sets of calendaring rolls can be utilized, and the calendaring rolls can be heated. Also, as depicted in FIG. 1, the fibrous web 70 travels through an oven 80, which can soften the fine fibers 10 such that the fine fibers 10 thermally bond to each other. Notably, the thermal bonding processes, i.e., calendaring and through-oven baking, among others, are expected to be performed at lower temperatures because of the lower molecular weight of the first polymer. Those having ordinary skill in the art will readily recognize that lower molecular weight polymers have lower softening points than higher molecular weight polymers. Accordingly, the lower softening point of the first polymer, which accounts for the bulk of the fine fibers strands 10, can be beneficial for forming laminate materials through calendaring or through-oven baking. At the end of the manufacturing line 30, the fibrous web 70 is taken up in a roll 85 for storage or transportation for further processing.

When Forcespinning® using a polymer solution, it is known that the viscosity of the solution bears directly on the achievable diameter of the fine fiber strand 10. Specifically, a lower viscosity solution will lead to fibers having a smaller fiber diameter. A low viscosity solution can be achieved in two ways. First, the concentration of the polymer in the solution can be lowered, and second, the molecular weight of the polymer in the solution can be lowered. However, each of these options has disadvantages. Lowering the concentration of the polymer in solution decreases the overall system throughput and increases the amount of solvent in the solution, which increases the cost of creating a nonwoven web product. On the other hand, lowering the molecular weight of the polymer in the solution leads to the formation of lower strength fibers, fiber breakage, and defect formation.

Table 1 provides a comparison of the viscosity of a solution containing various concentrations of three different polymer resins, Resin-A, Resin-B, and Resin-C. Resin-A has a higher molecular weight than Resin-B, which has a higher molecular weight than Resin-C. In these examples, each of Resin-A, Resin-B, and Resin-C was a thermoplastic urethane (TPU). Both Resin-A and Resin-B have molecular weights more than 1.5 times the molecular weight of Resin-C. Notably, Resin-B and Resin-C have the same molecular composition, and Resin-A has a different molecular composition than Resin-B and Resin-C. As can be seen from Table 1, a higher concentration of polymer in solution increases the viscosity of the solution. Also, for a solution containing a given concentration of polymer, a higher molecular weight polymer solution will have a higher viscosity than a lower molecular weight polymer solution. For each of the polymer solutions listed in Table 1, the polymer was dissolved in a solvent of a 35:65 mixture of dimethylformamide (DMF) to tetrahydrofuran (THF).

TABLE 1

Viscosity of Various Polymers Based on Concentration and Molecular Weight

| % Concentration | Resin-A | Resin-B | Resin-C |
|---|---|---|---|
| | | Viscosity (cPs) | |
| 9% | 119 | 90 | |
| 11% | 314 | 246.1 | 12.0 |
| 18% | | | 50.4 |
| 20% | | | 73.2 |
| 21% | | | 152 |
| 23% | | | 274 |

Comparative Example 1

Figure 3A:
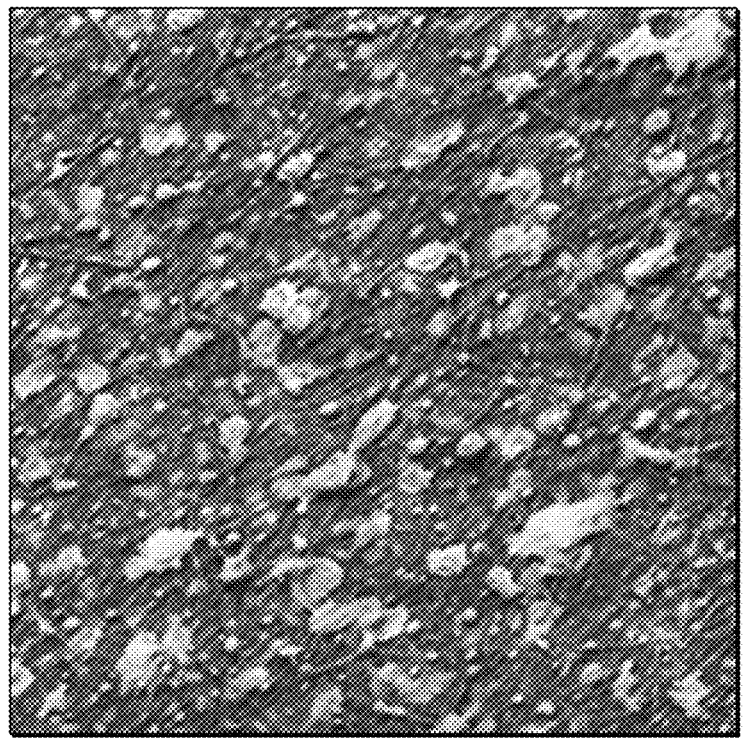
FIGS. 3A-B are SEM images of fibers spun from a low molecular weight resin.
Figure 3B:
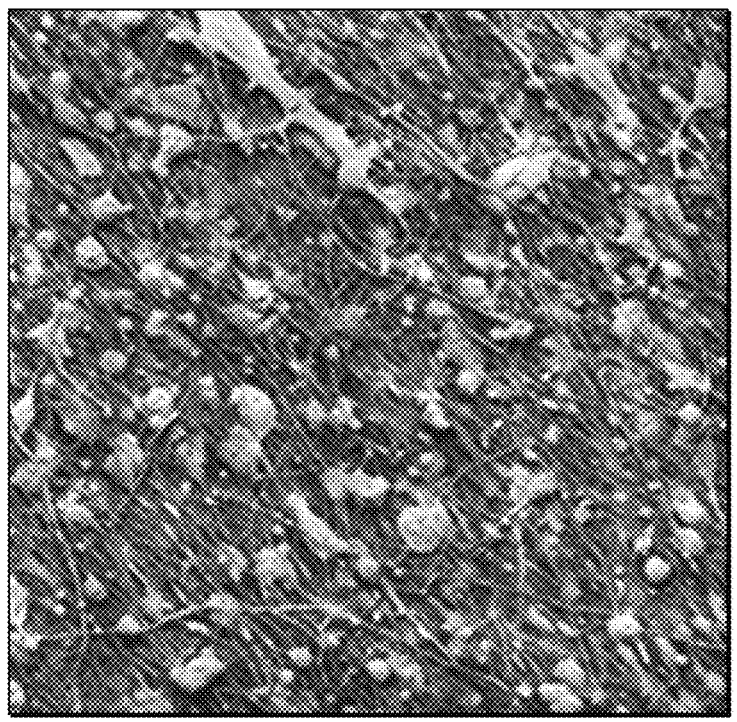

Two solutions containing Resin-C polymer (having the lowest molecular weight among Resin-A, Resin-B, and Resin-C) were prepared by dissolving Resin-C in a 35:65 mixture of DMF:THF. Both solutions were spun using Forcespinning® at 8000 rpm and head height of 5 cm. The resultant fibers were collected on nonwoven substrate in a continuous fashion using a roll-to-roll system as depicted in FIG. 1. The concentrations, viscosity, and resultant fiber diameters for the two solutions are summarized in Table 2, below. FIGS. 3A and 3B depict scanning electron microscope (SEM) images of the fibers resulting from the spinning of samples C1 and C2, respectively. The large white globules represent defects in the fibers, and FIGS. 3A and 3B demonstrate that fibers made from low molecular weight polymer contain many defects. It is believed that the defects are produced by the lower strength of the polymer solution during fiber formation. Advantageously, the low molecular weight of Resin-C allows for higher concentrations of polymer in the spinning solution (>20%), which makes Resin-C fibers more cost effective.

TABLE 2

Resin-C Solution and Fiber Properties

| Sample No. | % Concentration | Viscosity (cPs) | Fiber Diameter (nm) |
| --- | --- | --- | --- |
| C1 | 21% | 152 | 457 |
| C2 | 23% | 274 | 630 |

Comparative Example 2

Figure 4C:
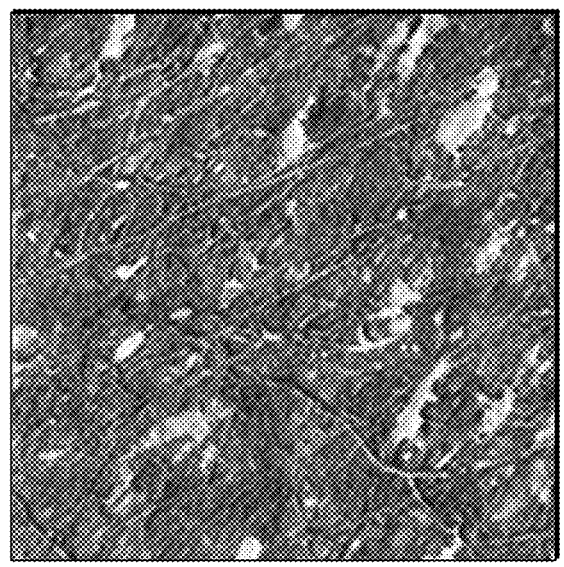
FIGS. 4A-C are SEM images of fibers spun from a high molecular weight resin.
Figure 4B:
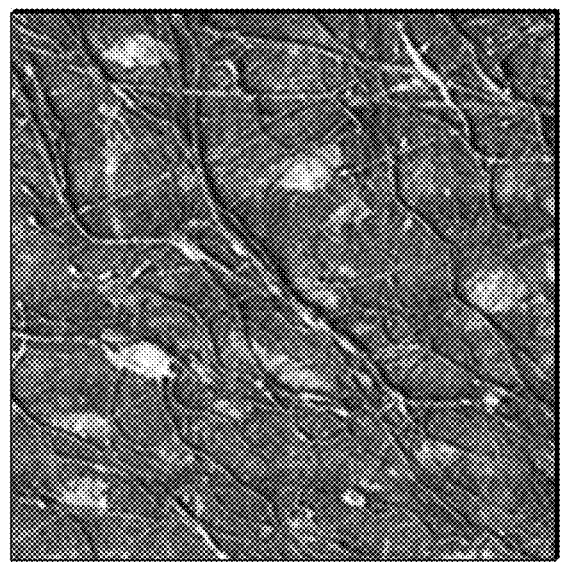
Figure 4A:
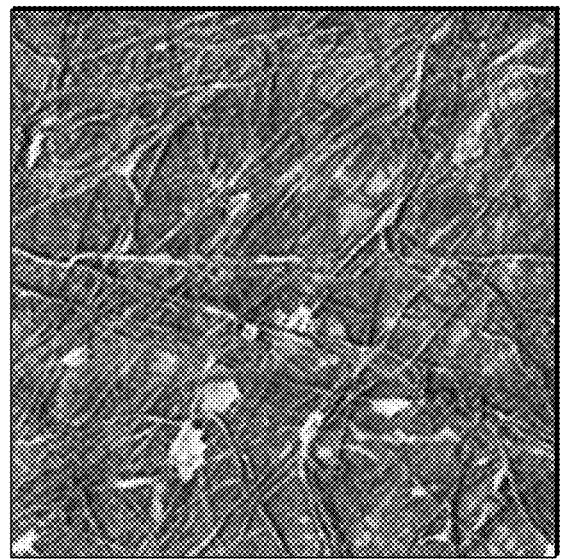
Figure 5C:
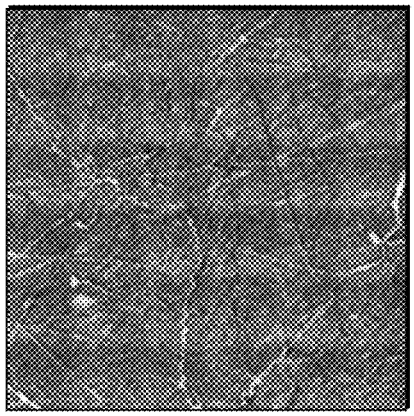
FIGS. 5A-C are SEM images of fibers spun from a 23% concentrated solution containing various ratios of a mixture of low molecular weight resin to high molecular weight resin.
Figure 5B:
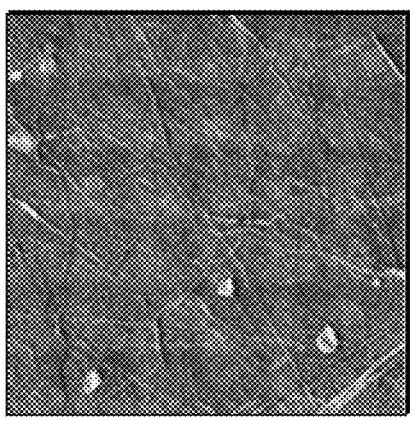
Figure 5A:
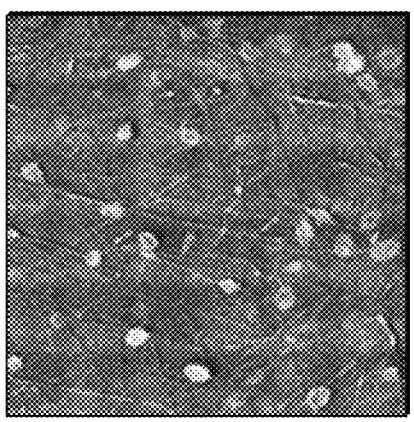

Three solutions containing Resin-A polymer (having the highest molecular weight among Resin-A, Resin-B, and Resin-C) were prepared by dissolving Resin-A in a 35:65 mixture of DMF:THF. The three solutions were spun using Forcespinning® at 8000 rpm and a head height of 5 cm. The resultant fibers were collected on nonwoven substrate in a continuous fashion using a roll-to-roll system as depicted in FIG. 1. The concentrations, viscosity, and resultant fiber diameters for the three solutions are summarized in Table 3, below. FIGS. 4A, 4B, and 4C depict SEM images of the fibers resulting from the spinning of samples C3, C4, and C5, respectively. As can be seen, the number of defects in these images is drastically reduced as compared to FIGS. 3A and 3B. Again, it is believed that the higher molecular weight, and attendant higher strength, played a part in lowering the defect rate. However, in order to achieve the desired nano-scale fiber diameter, the concentration of the polymer in solution had to be kept relatively low to keep the viscosity low. Thus, the expense of the producing the fibers was higher as a result of the increase in solvent content of the solution.

TABLE 3

Resin-A Solutions and Fiber Properties

| Sample No. | % Concentration | Viscosity (cPs) | Fiber Diameter (nm) |
| --- | --- | --- | --- |
| C3 | 9% | 119 | 500 |
| C4 | 10% | 140 | 517 |
| C5 | 11% | 314 | 702 |

Example 1

Considering the above-identified problems expressed in Comparative Examples 1 and 2, the present invention provides a solution in which the first polymer is mixed with the higher molecular weight second polymer. In this way, the first polymer is able to lower the viscosity of the solution while maintaining a high concentration of the polymer component of the solution (thereby increasing system throughput and decreasing solvent cost). The addition of the higher molecular weight second polymer addresses the problems of low fiber strength, fiber breakage, and defect formation.

Three solutions containing a 23% concentration of Resin-A polymer and Resin-C polymer (having the highest molecular weight and lowest molecular weight among Resin-A, Resin-B, and Resin-C, respectively) were prepared by dissolving various proportions of Resin-A and Resin-C in a 35:65 mixture of DMF:THF. The three solutions were spun using Forcespinning® at 8000 rpm and a head height of 5 cm. The resultant fibers were collected on nonwoven substrate in a continuous fashion using a roll-to-roll system as depicted in FIG. 1. The concentrations, mixing proportions, viscosity, and resultant fiber diameters for the three solutions are summarized in Table 4, below. Table 4 includes Sample No. C2 of Comparative Example 1 for comparison purposes. FIGS. 3A, 5A, 5B, and 5C depict SEM images of the fibers resulting from the spinning samples C2, E1, E2, and E3, respectively. From FIGS. 5A-5C, it is apparent that the defect rate decreases as the amount of Resin-A increases in the solution. Again, it is believed that the addition of the higher molecular weight Resin-A, and the attendant higher strength, played a part in lowering the defect rate. Table 4 also demonstrates that the concentration of polymer in the solution was able to be kept constant without causing a substantial increase in viscosity and fiber diameter even as the proportion of Resin-A increased in the solution.

TABLE 4

23% Concentration Solutions of Resin-A and Resin-C Mixtures

| Sample No. | % Concentration | Resin-C:Resin-A | Viscosity (cPs) | Fiber Diameter (nm) |
| --- | --- | --- | --- | --- |
| C2 | 23% | 100:0 | 274 | 630 |
| E1 | 23% | 95:5 | 198 | 583 |
| E2 | 23% | 90:10 | 298 | 760 |
| E3 | 23% | 80:20 | 611 | 915 |

Figure 6B:
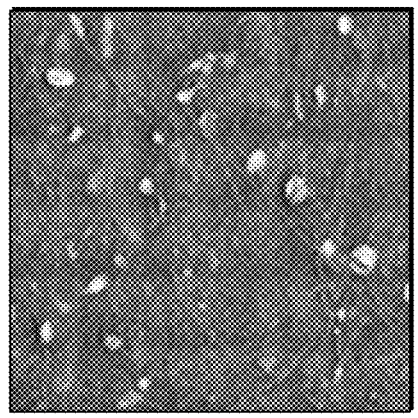
FIGS. 6A-B are SEM images of fibers spun from two different concentrations of solutions containing the same ratio of low molecular weight resin to high molecular weight resin.
Figure 6A:
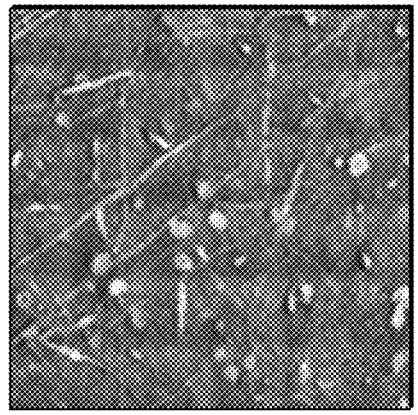

Two more solutions, each containing a 90:10 ratio of Resin-C:Resin-A, were prepared by dissolving Resin-C and Resin-A in a 35:65 mixture of DMF:THF to provide 19% and 21% polymer-concentrated solutions. The two solutions were spun using Forcespinning® at 8000 rpm and a head height of 5 cm. The concentrations, mixing proportions, viscosity, and resultant fiber diameters for the three solutions are summarized in Table 5, below. Table 5 includes Sample No. E2 for comparison purposes. FIGS. 6A and 6B depict SEM images of the fibers resulting from samples E4 and E5, respectively. As is apparent from FIGS. 6A and 6B and FIG. 5C, the rate of defects decreased as the concentration increased from 19% to 23%.

TABLE 5

Increasing concentration of Resin-A and Resin-C at same ratio

| Sample No. | % Concentration | Resin-C:Resin-A | Viscosity (cPs) | Fiber Diameter (nm) |
| --- | --- | --- | --- | --- |
| E4 | 19% | 90:10 | 194 | 483 |
| E5 | 21% | 90:10 | 211 | 500 |
| E2 | 23% | 90:10 | 298 | 760 |

Example 2

Figure 7:
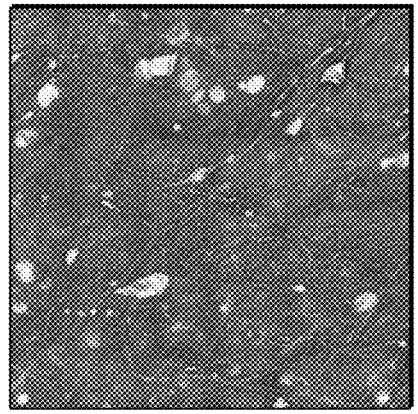
FIG. 7 depicts an SEM image of fibers spun from a solution of a low molecular weight polymer and another high molecular weight polymer.

Another solution was prepared containing a 92:8 ratio of Resin-C:Resin-B, with Resin-B having a higher molecular weight than Resin-C. As mentioned above, though, Resin-B and Resin-C have the same molecular composition. The solution had a polymer concentration of 20%, a viscosity of 149 cPs, and a fiber diameter of 371 nm. FIG. 7 is an SEM image of the fibers that were spun from this solution. As can be seen in FIG. 7, this polymer solution also resulted in fibers that had a significantly lower defect rate than, for instance, samples no. C1 and C2, which contained only Resin-C.

Accordingly, Examples 1 and 2 demonstrate that a polymer solution containing a lower molecular weight polymer and a higher molecular weight polymer can maintain a high concentration such that significant cost savings can be realized on solvent. Additionally, the solution maintains a low viscosity, such that nano-scale diameter fibers can be drawn during Forcespinning®.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A plurality of fine fiber strands comprised of:
    a first polymer and a second polymer, the second polymer having a higher molecular weight than the first polymer, the fine fiber strands having an average diameter of less than 2 micron, and the fine fiber strands having a length of at least 1 millimeter;
    wherein the second polymer has a molecular weight that is at least 1.5 times higher than the first polymer.

2. The plurality of fine fiber strands of claim 1, wherein the second polymer comprises between 1% and 25%, by weight, of the fine fiber strands.

3. The plurality of fine fiber strands of claim 1, wherein the first and second polymers are selected from the group consisting of polytetrafluoroethylene, polyvinylidene fluoride, other fluoropolymers, polyamide, polyester, cellulose and its derivatives, polysulfone, polyethylene, polypropylene, polystyrene, poly(4-vinylpyridine), thermoplastic urethanes.

4. A plurality of fine fiber stands comprised of:
    a first polymer and a second polymer, the second polymer having a higher molecular weight than the first polymer, the fine fiber stands having an average diameter of less than 2 micron, and the fine fiber strands having a length of at least 1 millimeter;
    wherein the second polymer has a molecular weight that is at least 1.5 times higher than the first polymer; and
    wherein one of the first and second polymers is selected to be more hydrophobic than the other of the first and second polymer.

5. The plurality of fine fiber strands of claim 1, wherein one of the first and second polymers is selected to have a higher strength than the other of the first and second polymers.

6. A method of forming the plurality of fine fiber strands of claim 1, comprising:
    dissolving the first and the second polymers in a solvent to form a polymer solution, the second polymer having a higher molecular weight than the first polymer;
    centrifugally expelling the polymer solution through orifices in at least one spinneret while rotating the spinneret at a speed of at least 2500 rpms; and
    drawing down a fiber diameter of the fine fiber strands through centrifugal force.

7. A method of forming a fibrous web from the plurality of fine fiber strands of claim 1, comprising:
    depositing the plurality of fine fiber strands on a substrate; and
    thermally, chemically, or adhesively bonding at least a portion of the plurality of fine fiber strands to the substrate.

8. The method of claim 7, wherein the substrate is a scrim made from a material selected from the group consisting of polyester, polypropylene, polytetrafluoroethylene, polyvinylidene fluoride, polyamides, cellulose, and combinations thereof.

9. The method of claim 7, wherein the thermally, chemically, or adhesively bonding is a thermal bonding step that includes the use of at least one set of calendaring rolls.

10. A method of forming a fibrous web from the plurality of fine fiber strands of claim 1, comprising:
    depositing the plurality of fine fiber strands on a moving belt;
    thermally, chemically, mechanically, or adhesively entangling the plurality of fine fiber strands to each other to form a fibrous web; and
    stripping the fibrous web from the moving belt.

11. The method of claim 10, further comprising calendaring the fibrous web using heated or unheated rollers so as to increase the density of the fibrous web.

12. The method of claim 10, further comprising bonding the fibrous web to a substrate so as to form a laminate structure.

13. The method of claim 10, further comprising heating the fibrous web to a temperature between the glass transition temperature and the melting temperature of the first polymer.

14. The method of claim 10, further comprising rolling up the fibrous web on a take-up roller at the end of a continuous process involving the depositing, entangling, and stripping steps.

15. A plurality of fine fiber stands comprised of:
a first polymer and a second polymer, the second polymer having a higher molecular weight than the first polymer, the fine fiber stands having an average diameter of less than 2 micron, and the fine fiber strands having a length of at least 1 millimeter;
wherein the second polymer has a molecular weight that is at least 1.5 times higher than the first polymer; and
wherein one of the first and second polymers is selected to have a higher tear resistance than the other of the first and second polymers.

* * * * *